(12) United States Patent
Deshpande et al.

(10) Patent No.: US 7,823,148 B2
(45) Date of Patent: Oct. 26, 2010

(54) SYSTEM AND METHOD FOR PERFORMING PATCH INSTALLATION VIA A GRAPHICAL USER INTERFACE

(75) Inventors: Alka K. Deshpande, Westford, MA (US); Nicholas J. DiRico, North Andover, MA (US); Gerald J. Hanam, Framingham, MA (US); Nancy Mann, Wenham, MA (US)

(73) Assignee: Oracle America, Inc., Redwood City, CA (US)

( * ) Notice: Subject to any disclaimer, the term of this patent is extended or adjusted under 35 U.S.C. 154(b) by 2036 days.

(21) Appl. No.: 10/222,346

(22) Filed: Aug. 15, 2002

(65) Prior Publication Data

US 2003/0218628 A1 Nov. 27, 2003

Related U.S. Application Data

(60) Provisional application No. 60/382,796, filed on May 22, 2002.

(51) Int. Cl.
*G06F 9/445* (2006.01)
*G06F 9/44* (2006.01)

(52) U.S. Cl. .............. 717/174; 717/175; 717/176; 717/177; 717/178; 717/168; 717/169; 717/170; 717/171; 717/172; 717/173

(58) Field of Classification Search .......... 717/168–178
See application file for complete search history.

(56) References Cited

U.S. PATENT DOCUMENTS

| | | | | |
|---|---|---|---|---|
| 5,586,304 A * | 12/1996 | Stupek et al. | ............... | 717/170 |
| 5,872,979 A * | 2/1999 | Edel et al. | ............... | 717/170 |
| 5,960,204 A * | 9/1999 | Yinger et al. | ............... | 717/176 |
| 5,974,258 A * | 10/1999 | Ferri et al. | ............... | 717/178 |
| 6,161,218 A * | 12/2000 | Taylor | ............... | 717/174 |
| 6,202,207 B1 * | 3/2001 | Donohue | ............... | 717/173 |
| 6,317,880 B1 * | 11/2001 | Chamberlain et al. | ....... | 717/174 |
| 6,347,397 B1 * | 2/2002 | Curtis | ............... | 717/170 |
| 6,360,365 B1 * | 3/2002 | Curtis | ............... | 717/169 |
| 6,367,075 B1 * | 4/2002 | Kruger et al. | ............... | 717/169 |
| 6,442,754 B1 * | 8/2002 | Curtis | ............... | 717/175 |
| 6,477,703 B1 * | 11/2002 | Smith et al. | ............... | 717/168 |
| 6,529,784 B1 * | 3/2003 | Cantos et al. | ............... | 700/79 |
| 6,571,389 B1 * | 5/2003 | Spyker et al. | ............... | 717/176 |
| 6,681,391 B1 * | 1/2004 | Marino et al. | ............... | 717/175 |
| 6,687,902 B1 * | 2/2004 | Curtis et al. | ............... | 717/175 |
| 6,698,018 B1 * | 2/2004 | Zimniewicz et al. | ........ | 717/175 |

(Continued)

*Primary Examiner*—Wei Y Zhen
*Assistant Examiner*—Qamrun Nahar
(74) *Attorney, Agent, or Firm*—Robert C. Kowert; Meyertons, Hood, Kivlin, Kowert & Goetzel, P.C.

(57) ABSTRACT

A system and method of installing a software patch on a selected electronic device using a graphical user interface is disclosed. The user utilizes a graphical user interface (GUI) to select a patch to install and selects an electronic device, the "target" device, upon which to install the patch. Patch dependencies on the target device are programmatically determined and checked to ensure that software required for the patch is present on the target device. The installation of the patch is then performed. The illustrative embodiment of the present invention also enables the removal of a patch from a targeted device following a determination of which applications on the target device are dependant upon the patch, and subsequent user authorization of the removal operation.

26 Claims, 9 Drawing Sheets

U.S. PATENT DOCUMENTS

| | | | |
|---|---|---|---|
| 6,859,923 B2* | 2/2005 | Taylor | 717/172 |
| 6,883,169 B1* | 4/2005 | Guilbeault et al. | 717/178 |
| 6,910,208 B1* | 6/2005 | Zimniewicz | 717/174 |
| 6,976,062 B1* | 12/2005 | Denby et al. | 709/220 |
| 6,983,449 B2* | 1/2006 | Newman | 717/121 |
| 6,996,815 B2* | 2/2006 | Bourke-Dunphy et al. | 717/168 |
| 2001/0056572 A1* | 12/2001 | Richard et al. | 717/11 |
| 2002/0133814 A1* | 9/2002 | Bourke-Dunphy et al. | 717/174 |
| 2002/0174422 A1* | 11/2002 | Kelley et al. | 717/178 |
| 2003/0159138 A1* | 8/2003 | Curtis | 717/175 |
| 2003/0163807 A1* | 8/2003 | Drake et al. | 717/174 |
| 2003/0195951 A1* | 10/2003 | Wittel et al. | 709/220 |
| 2003/0220992 A1 | 11/2003 | DiRico | |
| 2003/0221190 A1 | 11/2003 | Deshpande et al. | |
| 2003/0233648 A1* | 12/2003 | Earl et al. | 717/176 |
| 2004/0015946 A1* | 1/2004 | Te'eni et al. | 717/169 |

\* cited by examiner

Enter the Target System Name(s)

System Name 66
68
69
70 Add
71 Delete

SYSTEM AND METHOD FOR PERFORMING PATCH INSTALLATION VIA A GRAPHICAL USER INTERFACE

The present application claims priority to U.S. provisional application Ser. No. 60/382,796, filed on May 22, 2002, whose inventors are Alka K. Deshpande, Nicholas J. Dirico, Gerald J. Hanam and Nancy Mann. This disclosure is related to two co-pending applications filed concurrently with the present application: "A System and Method For Performing Patch Installation On Multiple Devices", U.S. application Ser. No. 10/222,234, whose inventors are Alka K. Deshpande and Gerald J. Hanam; and "Pre-Verification and Sequencing of Patches", U.S. application Ser. No. 10/222,602, whose inventor is Nicholas J. Dirico.

FIELD OF THE INVENTION

The illustrative embodiment of the present invention relates generally to software patches, and more particularly to the performance of software patch installations utilizing a graphical user interface.

BACKGROUND

Software frequently needs to be updated. New technological developments create a need for revisions and changes to existing software in order to maintain interoperability between software components and to enhance the effectiveness of the system utilizing the software. Conventionally the software updates, or "patches", are installed manually on an electronic device The manual installation of a patch requires a system administrator to review numerous installation files (such as README files) and run commands to check aspects of patch dependencies (required software) in order to validate the target device. The system administrator must ensure that the system architecture, operating system, and target application are all the correct version for the intended patch. The user performing the installation must have a proper authorization to perform the procedure. Additionally, the software patch frequently has dependencies of its own which require other additional software to be pre-installed on the target device. The accessibility and the compatibility of the additional software must also be verified prior to patch installation. The process of checking dependencies and validating the system is both time intensive and prone to errors due to the interdependent nature of the software components residing on the system being checked.

BRIEF SUMMARY OF THE INVENTION

The illustrative embodiment of the present invention provides a mechanism for installing a patch on an electronic device utilizing a graphical user interface. A system administrator or other authorized user interfaced with a network may perform the installation of a patch on an electronic device selected by the user via a single software wizard. The wizard programmatically pre-verifies the patch dependencies (pre-installed software) required by the software patch and checks the target device to ensure that the target device possesses the requisite software. The installation of the software patch is performed once all of the required software is present on an appropriate target device.

In one embodiment, an electronic device (the target device) is interfaced with a network. The target device holds a target application. A location accessible over the network holds a software patch which is an update for the target application. A graphical user interface is provided for a user interfaced with the network. The user uses the GUI to select the software patch and specify the target device. The software dependencies required for the software patch are determined and the target device is checked for the dependencies (i.e.: installed software). Upon verification that the software required for the software patch is installed on the target device, the software patch is installed.

In another embodiment, an electronic device (the target device) is interfaced with a network. The target device holds a target application and a software patch that was previously applied to the target application. A graphical user interface is provided for a user interfaced with the network. The user uses the GUI to select the software patch for removal from the target device. A listing of other software utilizing the selected software patch is programmatically determined and displayed to the user prior to removal. Upon authorization from the user, the software patch is removed from the target device.

DETAILED DESCRIPTION

The illustrative embodiment of the present invention provides a method of installing a software patch on a selected electronic device. The user utilizes a graphical user interface (GUI) to select a patch to install and selects an electronic device, (the "target" device), upon which to install the patch. Patch dependencies on the target device are programmatically determined and checked to ensure that software required for the patch is present on the target device. The installation of the patch is then performed. The illustrative embodiment of the present invention also enables the removal of a patch from a selected device following a determination of which software on the target device is dependent upon the patch, and subsequent user authorization of the removal process.

Figure 1:
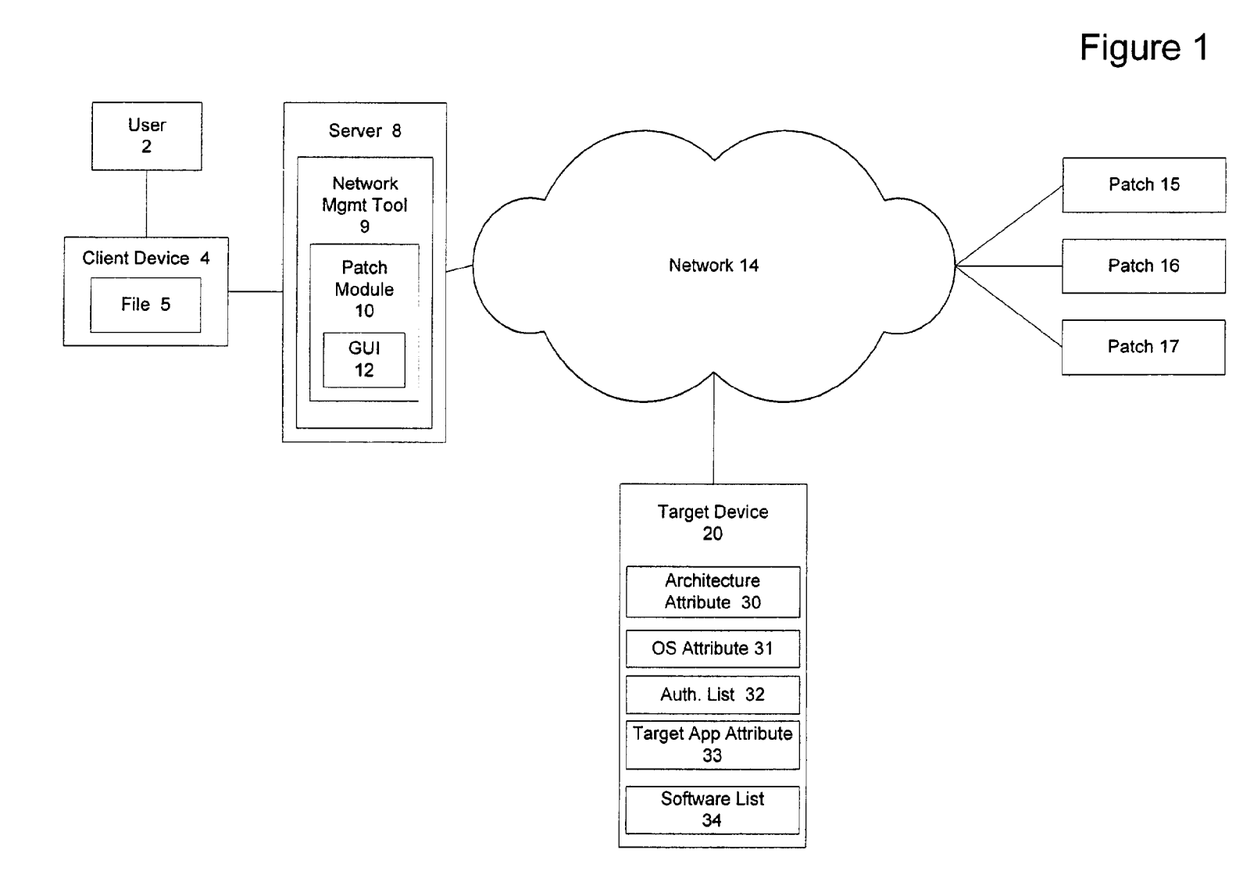
FIG. 1 is a block diagram of an environment suitable for performing the illustrative embodiment of the present invention.

FIG. 1 depicts an environment suitable for practicing the illustrative embodiment of the present invention. A user 2 accesses a client device 4 which is interfaced with a server 8. The client device 4 may be a desktop computer, workstation, PDA, network attached device or some other type of electronic device with a microprocessor that is interfaced with a network 14. The client device 4 may include a text file 5 listing target devices for a software patch. The server 8 includes a network management tool 9. The network management tool 9 includes a patch module 10 used to install software patches on selected target devices. The patch module 10 generates a GUI 12 which is utilized by the user to install patches. The server 8 is interfaced with the network 14. The network 14 may be a local area network (LAN), wide area network (WAN), an extranet, an intranet, the Internet, a satellite network or some other type of network. The network 14 is interfaced with a target device 20. Also, accessible over the network 14 are a plurality of patches 15, 16, and 17 which may be installed on the target device 20 after it has been validated and checked for patch dependencies.

The software patch 15, 16, or 17 selected by the user 2 may require other software to be previously installed on the target device prior to installation of the software patch (i.e.: it may have a patch dependency). The patch module 10 determines any patch dependencies required by the patch 15, 16 or 17. If a dependency is required, the patch module 10 queries the target device 20 to retrieve a software list 34 of the software currently installed on the target device. The software list 34 is checked to determine whether the target device already includes the software required by the selected patch 15, 16 and 17. If the target device 20 has been validated and the software patch dependencies have been satisfied, the selected patch is installed on the target device.

The illustrative embodiment of the present invention programmatically checks for the presence of patch dependencies for each selected patch and then verifies the satisfaction of the dependency. Those skilled in the art will recognize that a software dependency for a patch may require its own dependency, which in turn requires other dependencies. The software required by the dependency must be installed before the selected patch may be installed. The patch module 10 checks each generational dependency. If the target device is missing a dependency and the dependency is unavailable (or the user doesn't wish to install the dependency), the target device will not receive the software patch. Once the target device 20 is determined to satisfy the required patch dependencies, either by originally meeting the dependency requirements or by installing any missing software, the selected patch is installed on the target device.

Figure 2:
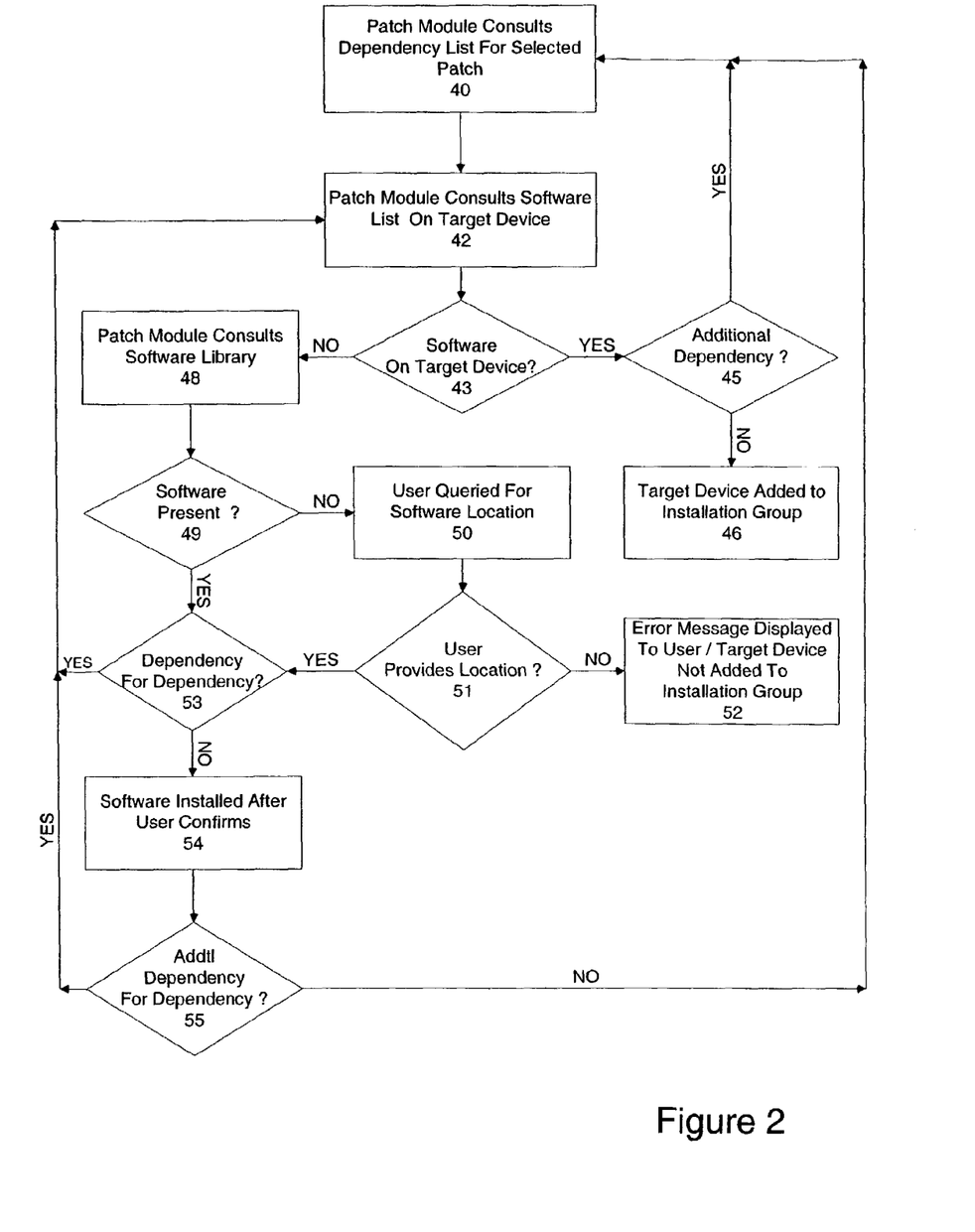
FIG. 2 is a flow chart of the sequence of steps followed by the illustrative embodiment of the present invention to check patch dependencies.

The illustrative embodiment searches generationally for patch dependencies and installs the required software (following user approval) recursively from the most remote dependency back to the original dependency that is associated with the selected patch. FIG. 2 is a flow chart of the sequence of steps followed by the illustrative embodiment of the present invention to determine patch dependencies. The sequence begins when the patch module 10 consults a dependency list for the selected patch (step 40). If there is no dependency associated with the selected patch, the patch module 10 adds the patch 15, 16 and 17 to the installation group, otherwise the patch module reviews a software list 34 located on the target device 20 (step 42). If the required software is present in the software list 34 indicating that the software is already installed on the target device, and there are not additional dependencies required by the software patch (step 45), the patch module adds the target device to the installation group (step 46). If there are additional dependencies, the process iterates and the next dependency is retrieved from the dependency list associated with the selected patch (step 40). If required software is not present on a target device (step 43), the patch module consults a software library (step 48) accessible over the network for the missing software. If the software required for the dependency is not present in the software library (step 49), the user is queried for the location of the missing software (step 50). If the user is unable to provide the location of the missing software (step 51), an error message is displayed to the user and the patch 15, 16 and 17 is not added to the installation, group (step 52). If the user can provide the location of the missing software for the dependency (step 51), the patch module 10 determines whether the missing software required by the dependency has any dependencies of its own (step 53). If the missing software required by the dependency has its own dependencies, the process iterates and the patch module consults the software list on the target device (step 42) to determine if the software required by the dependency is already present on the target device and if not, to locate the software. If the dependency does not have its own dependency, the software for the dependency is installed after the user indicates approval (step 54).

Those skilled in the art will recognize that the approval process may be a programmatic process without direct user supervision. Alternatively, every installation may be displayed to the user 2 and require approval from the user prior to installation. After installation of the software required by a dependency (step 54), a determination is made as to whether or not there are additional dependencies for dependencies (step 55). If there are additional dependencies for a dependency (step 55), the process iterates and the patch module 10 consults the software list 34 on the target device. If there are not additional dependencies for a dependency (step 55), the process iterates to make sure all of the original dependencies have been satisfied (step 40). Those skilled in the art will recognize that a selected patch may have more than one listed dependency that is associated with the patch. Furthermore, for each dependency, the dependency may have one or more dependencies.

The illustrative embodiment of the present invention provides the ability for a user 2 to specify the removal of a patch from a selected target device. Utilizing the process outlined above, the user selects a target device and specifies the location of the installed patch on the target device. The patch module 10 presents to the user 2 a list of any other applications on the target device that are dependent on the selected patch. The removal of one patch may require the removal of another patch or multiple patches. The user 2 is presented with this information via the GUI 12 prior to the selected patch being removed. Following confirmation received from the user 2, the patch is removed from the target device.

The patch installation process may result in a number of different types of error messages being displayed to the user 2. The patch module 10 may display a message that software required for a dependency is not present and is not retrievable. Alternatively, the patch module 10 may display a message that software required for a dependency is available but must be installed prior to installing the selected patch. Similarly, the patch module 10 may display a message that a selected patch has been rendered obsolete by the presence of another patch that is already on the target device. A message may be displayed that the selected patch is already on the target device. A different message may be displayed that the selected patch can not be installed because it conflicts with a previously installed patch. Similarly, during the validation process, an error message may indicate that the target device has the wrong operating system, architecture or target application attribute. Those skilled in the art will recognize that other error messages may be displayed without departing from the scope of the present invention.

Figure 3A:
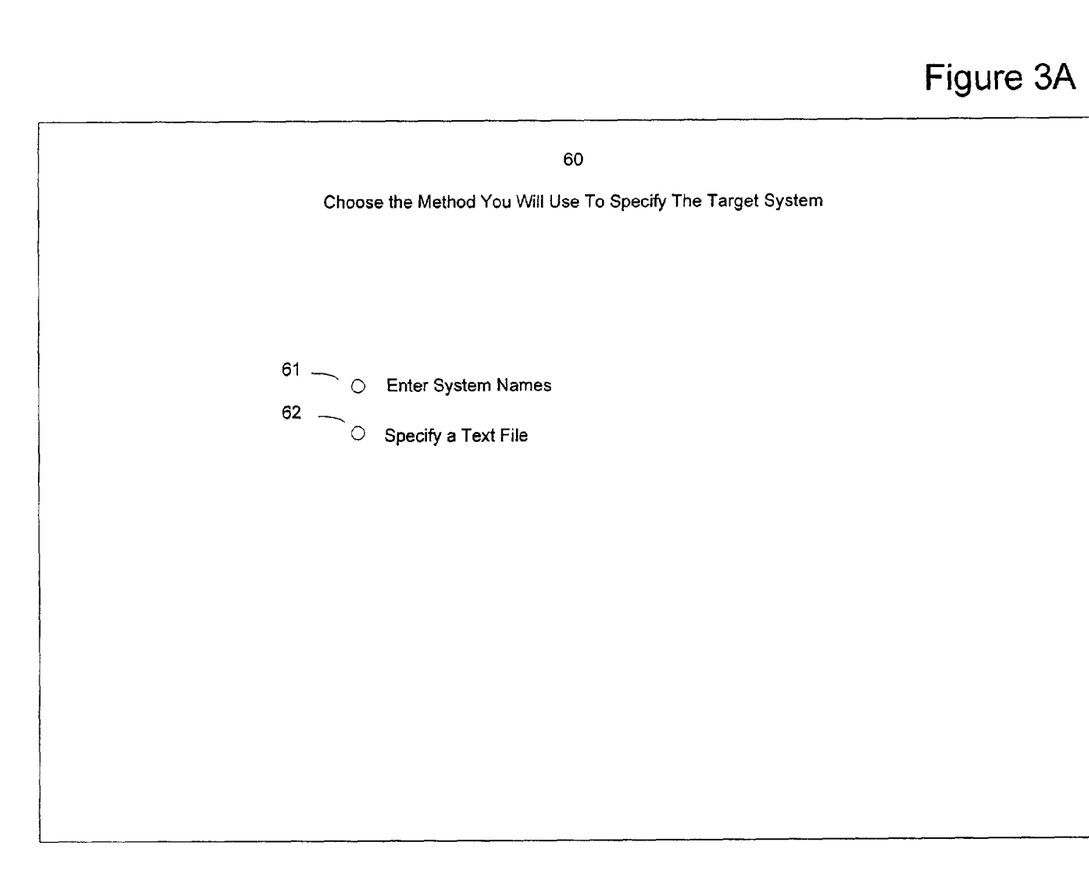
FIG. 3A is a block diagram of the GUI requesting the user to specify a selection method for choosing a target device.
Figure 3B:
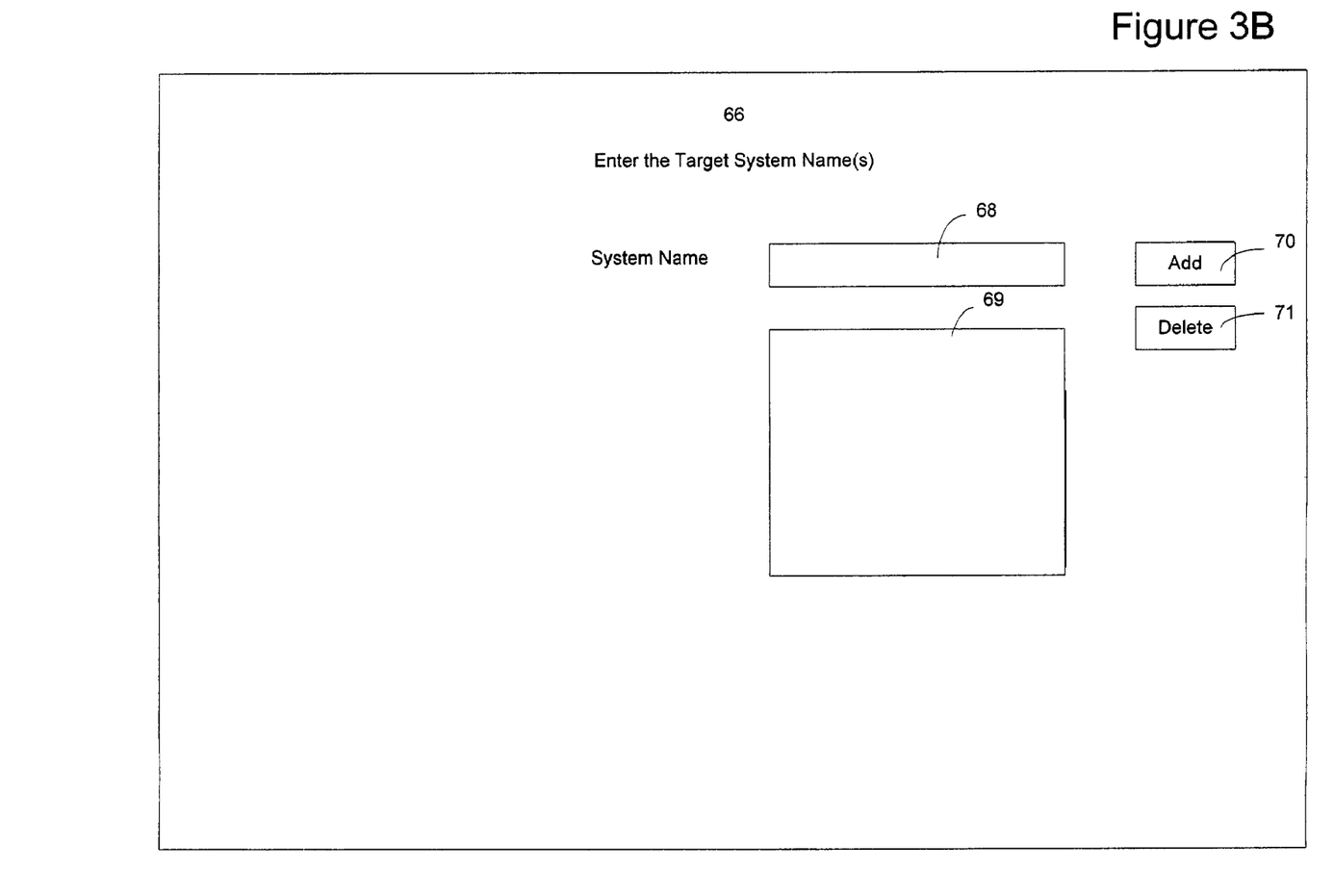
FIG. 3B is a block diagram of the GUI requesting the user to specify the system name of a target device.
Figure 3C:
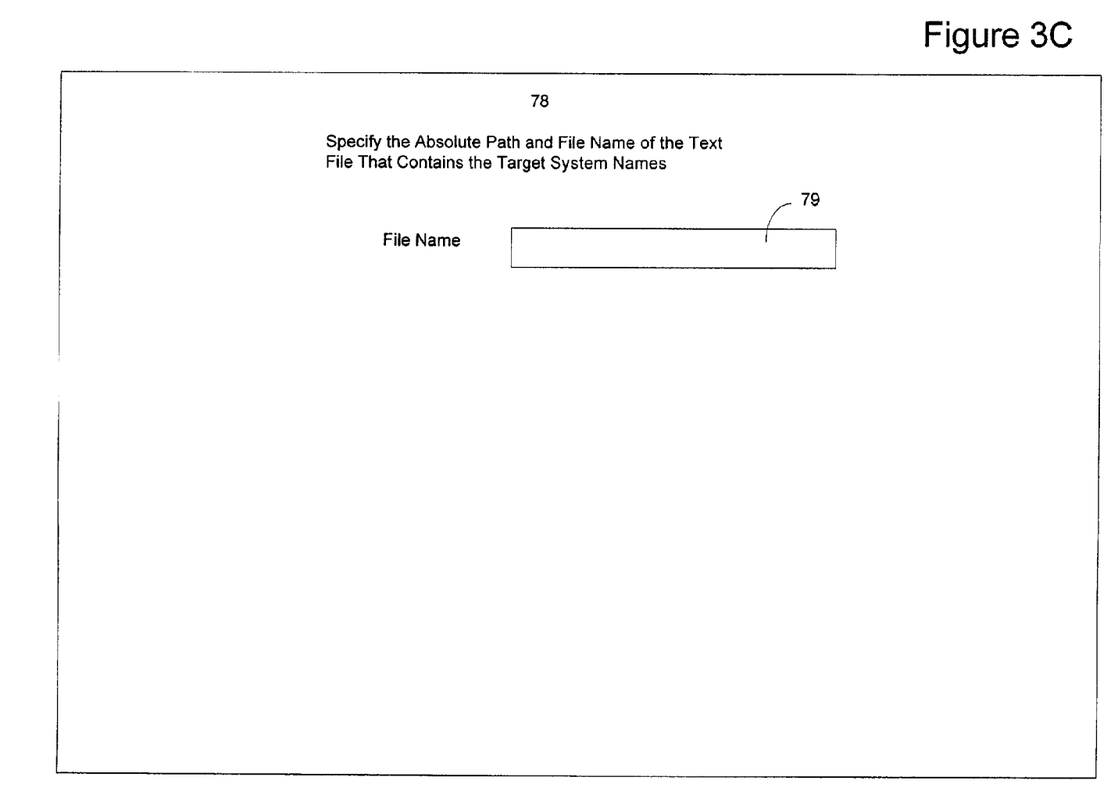
FIG. 3C is a block diagram of the GUI requesting the user to specify the absolute path and file name of a text file holding the location of the target device.

The user 2 utilizes the GUI 12 to specify the location of the target device. The patch module 10 leads the user through the installation process. FIG. 3A depicts a screen display 60 from the GUI 12 requesting the user to choose a method of specifying a target device. The user 2 indicates via control buttons whether they will specify either a system name 61 or a text file 62 (which holds the location of the target device). FIG. 3B depicts a screen display 66 from the GUI 12 which is generated when the user chooses to enter the target device name. The screen display 66 includes a dialog box 68 for the user 2 to enter the target device name and display window 69 where the added device(s) is listed. Also displayed are an add button 70 used to add a target device listed in the dialog box 68 to the display window 69 and a delete button 71 used to remove target devices from the display window 69. FIG. 3C depicts a screen display 78 from the GUI 12 which is generated when the user chooses to enter the location of a text file holding the location of the target device. The screen display 78 includes a dialog box 79 for the user 2 to enter the absolute path and file name of the text file holding the target device name. The patch module 10 then extracts the location of the target device from the text file. Those skilled in the art will recognize that the user 2 may enter more than one target device without departing from the scope of the present invention. Similarly, a number of different controls such as dialog boxes, buttons and pull-down menus may be utilized in the GUI 12 without departing from the scope of the present invention.

Figure 4A:
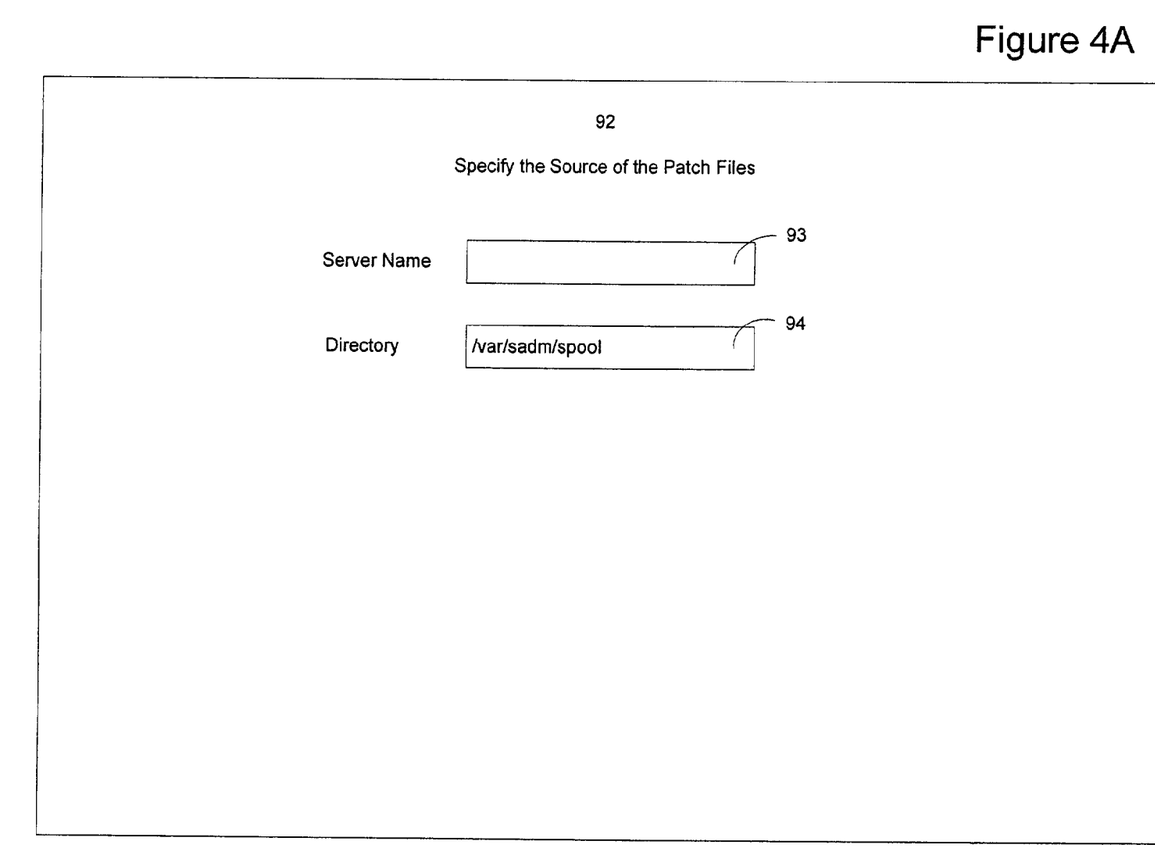
FIG. 4A is a block diagram of the GUI requesting the user to specify the source of the patch file.
Figure 4B:
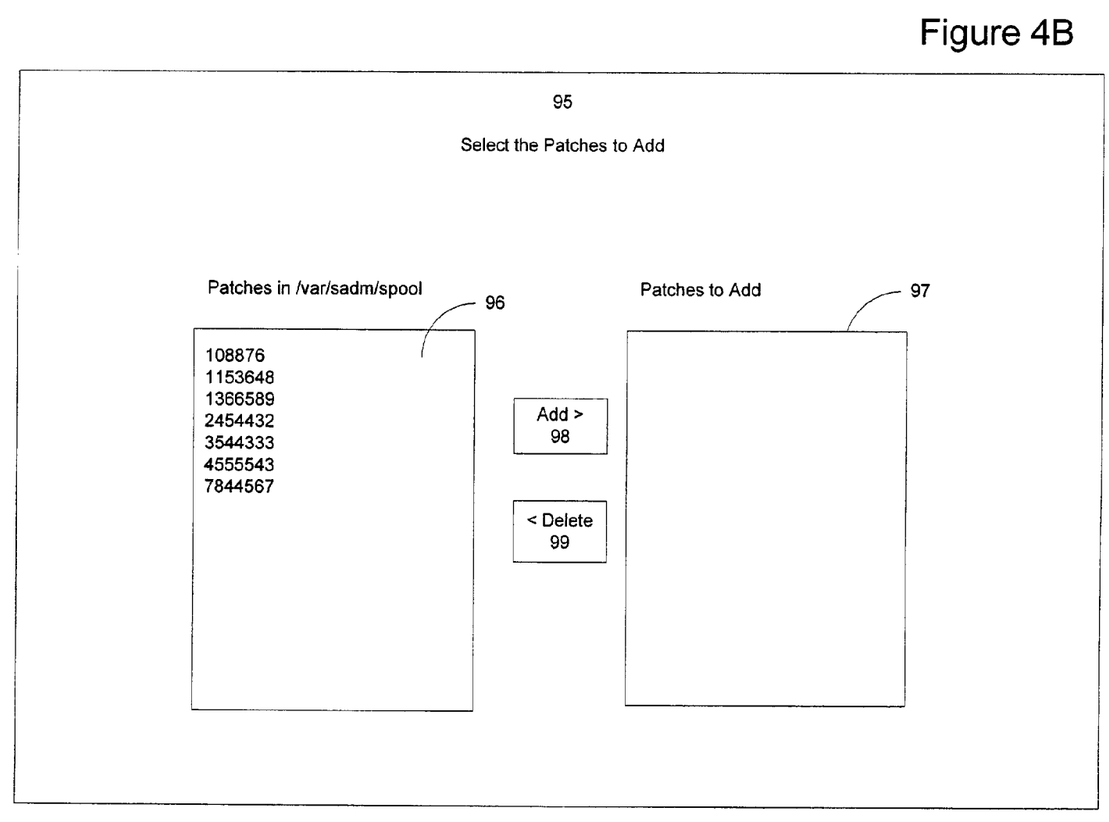
FIG. 4B is a block diagram of the GUI requesting the user to select the patch file(s) to be added to the target device.

The GUI 12 is used to specify the source of the patch file. FIG. 4A depicts a screen display 92 of the GUI 12 which requests a user to enter into dialog boxes 93 and 94 the server name and directory holding the patch files. FIG. 4B depicts a screen display 95 of the GUI 12 which lists in a display window 96 all of the software patches stored in the location specified by the user 2. A second display window 97 lists all of the patches the user has chosen to add. An add button 98 and a delete button 99 are used to add and remove patches to the second display window 97. The user 2 selects one or more patches listed in the display window 96 and clicks the add button to finalize the selection. The patch then appears in the second display window 97. The delete button 99 works in a similar manner. Once selected, each patch is checked for any patch dependency requirements which are then compared with the software installed on the target device 20. Those skilled in the art will recognize that the file 5 containing the listed devices for patch installation may be located anywhere accessible over the network. In the event of large scale repetitive installations, the maintenance of a text file provides an efficient mechanism for updating the target devices.

The patch module 10 also determines the authority level associated with the user 2. The authority level for the user 2 is compared against the authority level required for patch installations on the target reference device 20. If the user's authority level is valid for the installation process the target device is added to an installation group 9. If the user's authority level is not valid to perform installation on the target device, the patch is not installed. Those skilled in the art will recognize that there are a number of ways of determining a user's authority to perform a patch installation, including consulting an authorized list of users 32 stored on the target device 20.

Following the verification of the authority of the user 2, the user 2 utilizes the GUI 12 from the patch module 10 to select a target device 20 as a possible recipient for a software patch update. The patch module 10 validates the target device 20 as suitable to receive the software patch 15, 16 or 17. The validation process analyzes a plurality of attributes related to the target device including an architecture attribute 30, an OS attribute 31, and a target application attribute 33 to confirm they meet the requirements of the software patch 15, 16 and 17. In one embodiment, all of the attributes are used in the validation process. In other embodiments, only some of the attributes are utilized. Those skilled in the art will recognize that other attributes may be used in combination with, or in place of, the architecture attribute 30, the OS attribute 31, and the target application attribute 33 without departing from the scope of the present invention. The architecture attribute indicates the architecture attributes of the target device 20, such as whether the device is using a SPARC 64 bit processor or an Intel™ 32 bit processor. The operating system attribute 31 indicates the operating system type (i.e.: Unix™, Windows™, Linux, etc.) and the version of the operating system (i.e.: Solaris™ 7.0) running on the selected target device. The target application attribute 33 indicates the version of the target application software that the patch is designed to update. Those skilled in the art will recognize that in certain situations the software patch is designed to update an operating system and accordingly the operating system attribute 31 and the target application attribute 33 will be the same in those cases.

Figure 5:
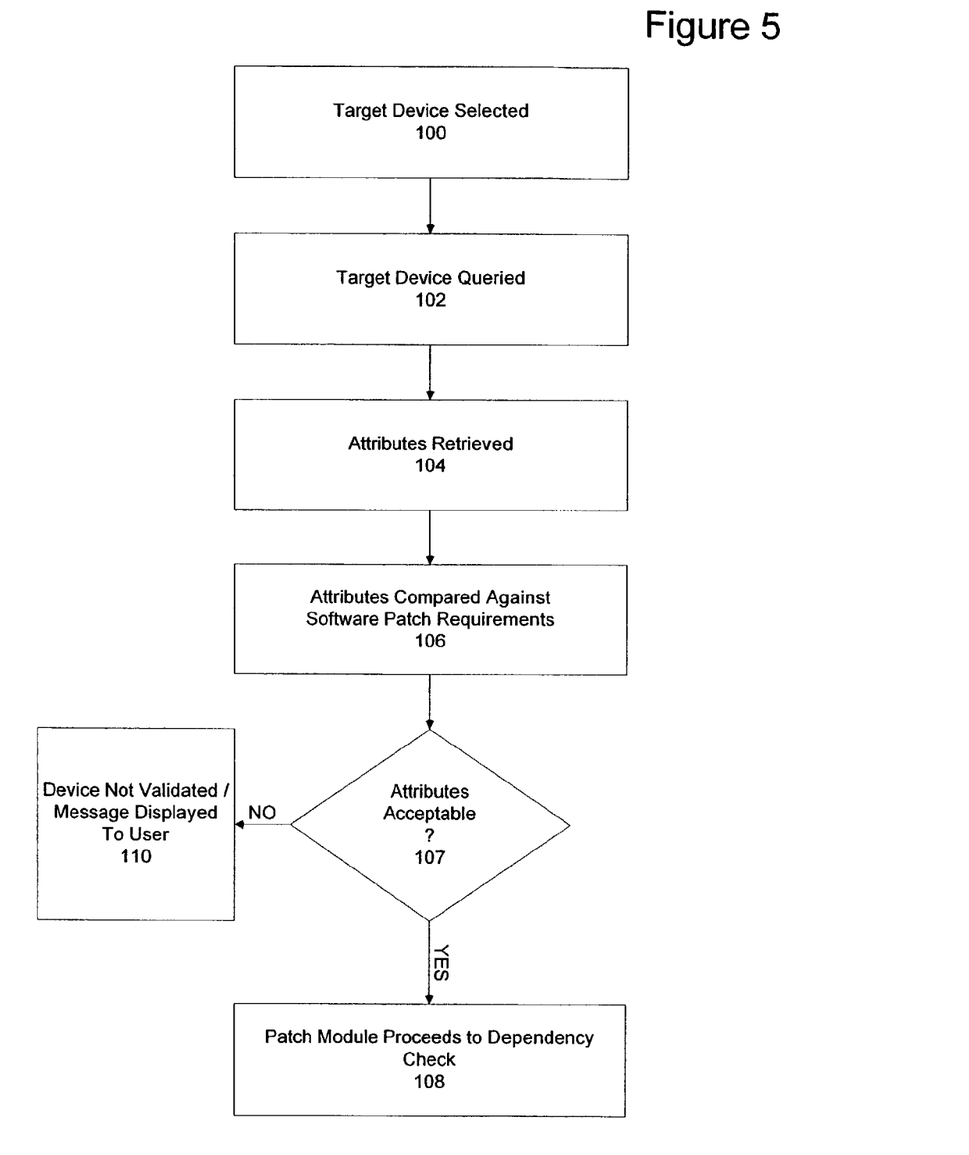
FIG. 5 is a flow chart of the sequence of steps followed by the illustrative embodiment of the present invention to retrieve attributes from the target device during the validation process.

FIG. 5 is a flow chart of the sequence of steps followed by the illustrative embodiment of the present invention to validate devices. The sequence begins when the user 2 selects a target device 20 (step 100). The user 2 may indicate each target device individually by specifying the name of a file. The patch module 10 queries the target device 20 (step 102) and retrieves attributes necessary for the installation process (step 104). A determination is made as to whether the device is validated by comparing the retrieved attributes against attributes required for the installation of the software patch 15, 16, and 17 (step 106). In one embodiment, the patch module 10 utilizes the Common Information Model (CIM) to set up a connection with the target devices. The patch module 10 queries the target device for the attributes necessary to execute the installation process. A Common Information Model Object Manager (CIMOM) on the target device enables access to the target device and responds to the query for attributes. The attributes retrieved from the target device 20 may include an architecture attribute 30, an OS attribute 31, and a target application attribute 33. As noted previously, the operating system attribute 31 and target application attribute 33 may be identical in situations where the software the patch is targeted to an operating system. If the comparison of the attributes indicates that the target device 20 meets the required validation parameters (step 107), the patch module proceeds to a dependency check for the selected software patch (step 108). Alternatively, if the comparison of the attributes reveals that the attributes are not acceptable (step 106) the device is not validated and an appropriate error message detailing the cause of the validation failure is displayed to the user 2 (step 110).

Figure 6:
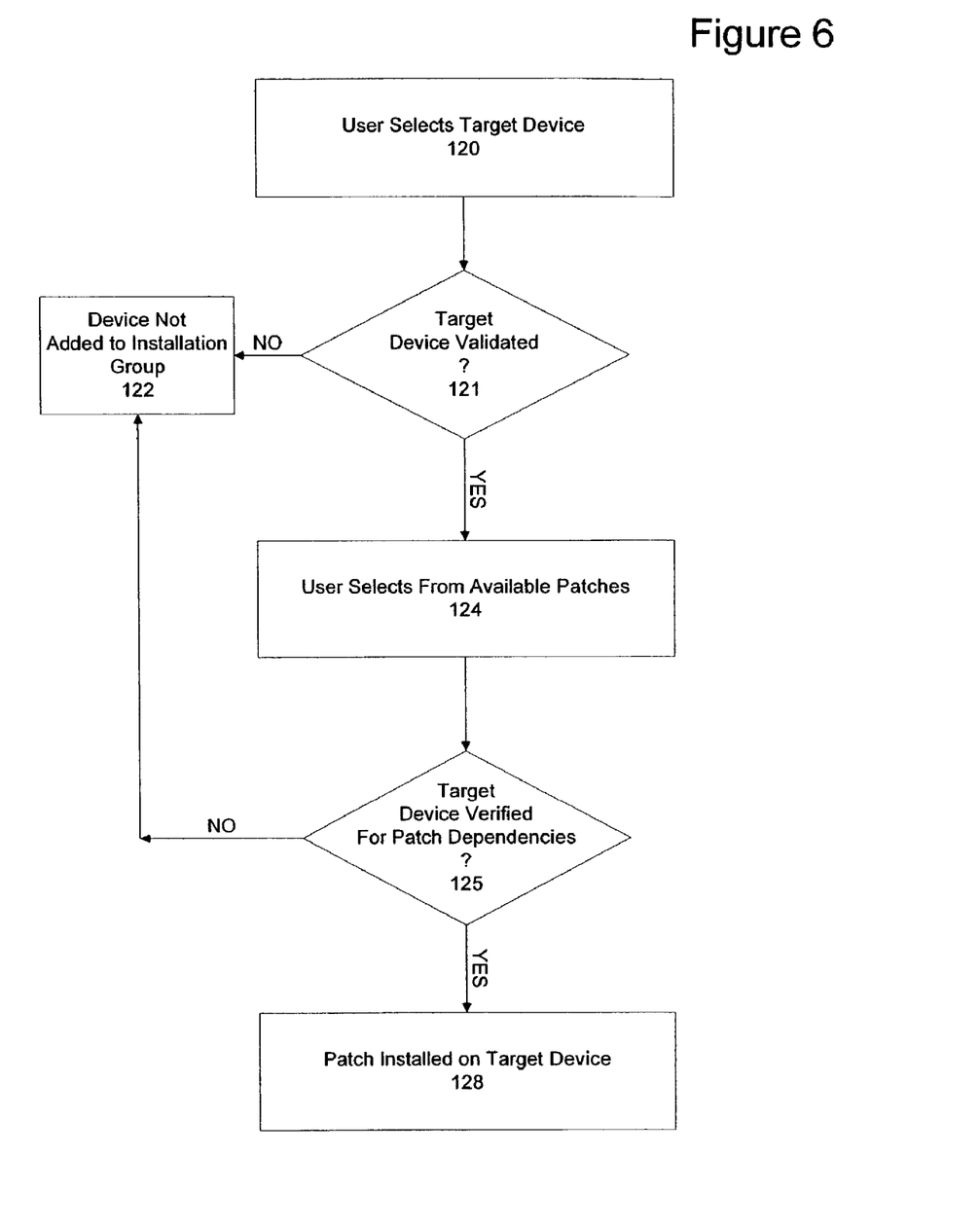
FIG. 6 is a flow chart of a top level view of the sequence of steps followed by the illustrative embodiment of the present invention to install a software patch on a target device.

FIG. 6 is a flowchart depicting a top-level view of the overall sequence of steps followed by the illustrative embodiment of the present invention to install a software patch on a selected target device 20. The sequence begins when the user 2 uses the GUI 12 to select the target device 20 to receive a patch installation (step 120). The user 2 may individually specify the device for patch installation, or the user may specify a text file 5 containing the location of a device or devices for patch installation. The target validation process attempts to validate the selected device as outlined above (step 121). If the selected target device 20 is determined to be not valid (step 121) the device is not added to the installation group (step 122). If the selected target device is determined to be valid (step 121), the user proceeds to select one or more patches 15, 16 and/or 17 for installation (step 124). The patch dependency verification process (step 125) is performed as outlined above to verify the presence of required software on the target device. If the software dependency requirements can be satisfied (step 125) the target device 20 is added to the installation group and the patch is installed following user approval (step 128). If the software dependency requirements can not be met for the target device, it is not added to the installation group (step 122).

In one embodiment, the network management tool 9 which includes the patch module 10 may be split between a client portion stored on the client device 4 and a server portion stored on the server 8. Those skilled in the art will recognize that the client and server portion may be located on the same electronic device. In one embodiment, the network management tool 9 may provide a graphical user interface (GUI) 12 such as those found in the Solaris management console from Sun Microsystems, Inc. of Palo Alto, Calif.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. In a network with an interfaced electronic device having a target application, a method, comprising the steps of:
   providing a software patch for said target application at a location interfaced with said network, said software patch being an update for said target application;
   determining programmatically, prior to installing said software patch, whether said software patch is suitable for installing for said target application at said electronic device;
   determining programmatically a set of dependencies required by said software patch, said dependencies being installed software required for installation of said software patch;
   querying said electronic device to determine whether said electronic device includes said set of dependencies prior to installing said software patch;
   in response to determining that said electronic device does not include one or more particular dependencies of said set of dependencies:
      for each particular dependency of the one or more particular dependencies:
         locating a respective source from which an additional software patch corresponding to the particular dependency is accessible; and
         accessing said respective source to install said additional software patch on said electronic device; and
      installing said software patch for said target application on said electronic device after determining that said electronic device includes said set of dependencies.

2. The method of claim 1, comprising the further steps of:
   providing a graphical user interface (GUI) for a user interfaced with said network;
   displaying a message to said user with said GUI indicating results of said querying prior to installing said software patch; and
   performing said installing of said software patch following a receipt of an authorization from said user received after said displaying of said message.

3. The method of claim 2 wherein said message indicates that said software patch requires a missing patch which is stored in a location accessible over said network.

4. The method of claim 3 comprising the further step of:
   retrieving said missing patch from said location accessible over said network; and
   installing said missing patch prior to installing said software patch, said installing of said missing patch occurring after user authorization.

5. The method of claim 4, comprising the further step of:
   determining programmatically that said missing patch required by said software patch has a dependency;
   retrieving said dependency for said missing patch from a location accessible over said network; and
   installing said dependency for said missing patch on said electronic device prior to installing said missing patch, said installing of said dependency for said missing patch occurring following user authorization.

6. The method of claim 2 wherein said message indicates that said software patch requires a missing patch which is stored in a location that is not accessible over said network.

7. The method of claim 2 wherein said message indicates that said software patch conflicts with a different patch located on said electronic device.

8. The method of claim 2 wherein said message indicates that said software patch is already located on said electronic device.

9. The method of claim 2 wherein said message indicates that said software patch is rendered obsolete by a patch that is already located on said electronic device.

10. The method of claim 2, comprising the further step of:
    wherein said determining programmatically, prior to installing said software patch, whether said software patch is suitable for installing for said target application at said electronic device comprises comparing, to a pre-defined parameter, at least one of:
       a target application attribute, said target application attribute describing a version of said target application,
       an operating system attribute, said operating system attribute describing a type and a version of an operating system in use at said electronic device, and
       an architecture attribute, said architecture attribute describing an architecture of said electronic device.

11. The method of claim 10, further comprising:
    in response to determining that said architecture attribute is not compatible with said pre-defined parameter, displaying a message via said GUI indicating that said software patch will not be installed because said software patch requires the electronic device to have a different architecture.

12. The method of claim 10, further comprising:
    in response to determining that said target application attribute is not compatible with said pre-defined parameter, displaying a message via said GUI indicating that said software patch will not be installed because said software patch requires said target application on said electronic device to have a different target application attribute.

13. The method of claim 10, further comprising:
    in response to determining that said operating system attribute is not compatible with said pre-defined parameter, displaying a message via said GUI indicating that said software patch will not be installed because the software patch requires the operating system on said electronic device to have a different operating system attribute.

14. The method of claim 2 wherein an authorization level of said user to install said software patch on said electronic device is verified prior to installing said patch.

15. The method of claim 1, wherein the one or more particular dependencies comprise a first dependency and a second dependency, wherein the first dependency corresponds to a first additional software patch and the second dependency corresponds to a second additional software patch, wherein the first additional software patch is accessed from a first source, wherein the second additional software patch is accessed from a second source, wherein the first source differs from the second source.

16. The method as recited in claim 1, further comprising:
receiving programmatic approval to locate and install a plurality of additional software patches corresponding to the one or more particular dependencies without requiring separate user interactions for each additional software patch of the plurality of additional software patches; and
in response to receiving said programmatic approval, locating the respective sources and accessing the respective sources to install the additional software patches without separate user interactions for each additional software patch.

17. The method of claim 1, wherein said locating the respective source comprises:
querying a software library accessible via said network to determine whether the software library comprises the additional software patch; and
in response to determining that the software library comprises the additional software patch, identifying the software library as the respective source.

18. The method of claim 17, wherein said locating the respective source further comprises:
in response to determining that the software library does not comprise the additional software patch, querying a user via a user interface to specify a location of the additional software patch; and
in response to input provided by the user via the user interface specifying a location, identifying the location as the respective source.

19. The method of claim 1, further comprising:
receiving input via a target device specification interface specifying a plurality of additional electronic devices accessible via said network at which said software patch is to be installed without user supervision; and
performing said querying and said installing of said software patch on each additional electronic device of the plurality of additional electronic devices without user supervision.

20. The method of claim 19, wherein said receiving input comprises receiving an identification of a text file comprising a list of names of the plurality of additional electronic devices.

21. A non-transitory storage medium storing program instructions computer-executable to perform steps for a method, said method comprising the steps of:
providing, at a location interfaced with a network, a software patch for a target application on an electronic device interfaced with said network, said software patch being an update for said target application;
determining programmatically, prior to installing said software patch, whether said software patch is suitable for installing for said target application at said electronic device;
determining programmatically a set of dependencies required by said software patch, said dependencies being installed software required for installation of said software patch;
querying said electronic device to determine whether said electronic device includes said set of dependencies prior to installing said software patch;
in response to determining that said electronic device does not include one or more particular dependencies of said set of dependencies:
for each particular dependency of the one or more particular dependencies:
locating a respective source from which an additional software patch corresponding to the particular dependency is accessible; and
accessing said respective source to install said additional software patch on said electronic device; and
installing said software patch for said target application on said electronic device after determining that said electronic device includes said set of dependencies.

22. The storage medium of claim 21, wherein said method comprises the further steps of:
providing a graphical user interface (GUI) for a user interfaced with said network;
displaying a message to said user with said GUI indicating results of said querying prior to installing said software patch; and
performing said installing of said software patch following a receipt of an authorization from said user received after said displaying of said message.

23. The storage medium of claim 22, wherein said method comprises the further steps of:
determining programmatically that said software patch requires a missing patch;
retrieving said missing patch required for said software patch from a location accessible over said network; and
installing said missing patch prior to installing said software patch, said installing of said missing patch occurring after user authorization.

24. The storage medium of claim 23, wherein said method comprises the further steps of:
determining programmatically that said missing patch required by said software patch has a dependency;
retrieving said dependency required for said missing patch from a location accessible over said network; and
installing said dependency required for said missing patch on said electronic device prior to installing said missing patch, said installing of said dependency for said missing patch occurring following user authorization.

25. A method, comprising the steps of:
using a computer to perform:
providing a graphical user interface (GUI) for a user interfaced with a network interfaced electronic device, said electronic device holding a software patch, and said software patch being an update for a particular application on said electronic device that was previously applied to the particular application to update the particular application subsequent to its initial installation;
receiving instructions from said user via said GUI to remove said software patch from said electronic device;
determining programmatically one or more applications on said electronic device other than the particular application that are also dependent on said software patch prior to removing said software patch; and in response to said determining:
> displaying with said GUI a listing identifying said one or more applications on said electronic device dependent on said software patch to said user;
>
> prompting said user, via said GUI, to authorize removal of the software patch;
>
> receiving, via said GUI, input from said user indicating that removal of the software patch is authorized; and
>
> removing said software patch from said electronic device in response to the input from said user that indicates that the removal of the software patch is authorized.

26. A system, comprising:

a processor; and memory coupled to said processor, wherein the memory comprises program instructions executable by the processor to:
> obtain a software patch for a target application at an electronic device accessible via a network, said software patch being an update for said target application;
>
> determine programmatically, prior to installing said software patch, whether said software patch is suitable for installing for said target application at said electronic device;
>
> determine programmatically a set of dependencies required by said software patch, said dependencies being installed software required for installation of said software patch;
>
> query said electronic device to determine whether said electronic device includes said set of dependencies;
>
> in response to determining that said electronic device does not include one or more particular dependencies of said set of dependencies:
>> for each particular dependency of the one or more particular dependencies:
>>> identify a respective source from which an additional software patch corresponding to the particular dependency is accessible; and
>>>
>>> access said respective source to install said additional software patch on said electronic device; and
>>
>> install said software patch for said target application on said electronic device after determining that said electronic device includes said set of dependencies.

* * * * *